United States Patent [19]
Regitz

[11] 3,774,171
[45] Nov. 20, 1973

[54] READ ONLY MEMORY ORGANIZATION

[75] Inventor: William M. Regitz, Cupertino, Calif.

[73] Assignee: Honeywell Information Systems Inc., Waltham, Mass.

[22] Filed: Nov. 8, 1971

[21] Appl. No.: 196,304

[52] U.S. Cl. .......... 340/173 SP
[51] Int. Cl. .......... G11c 11/36, G11c 17/00
[58] Field of Search .......... 340/173 SP, 174 SP

[56] References Cited

UNITED STATES PATENTS

| | | | |
|---|---|---|---|
| 3,681,764 | 8/1972 | Conant, Jr. | 340/173 |
| 3,609,708 | 9/1971 | Cragon | 340/174 SP |
| 3,631,407 | 12/1971 | Cotter | 340/174 SP |
| 3,678,475 | 7/1972 | Jordan et al. | 340/173 SP |

*Primary Examiner*—Stanley M. Urynowicz, Jr.
*Attorney*—Ronald T. Reiling

[57] ABSTRACT

A read only memory is provided which minimizes the number of solid state elements required by having these elements represent the fewer number of binary states in each digit line. Inverter means are also provided to ensure a consistent representation to the output of the read only memory plane. A further feature completely eliminates the solid state elements by substituting a plurality of digit lines and solid interconnections for the solid elements previously required. The invention may be utilized in a recognition system having a multisignal address and a plurality of memory planes.

8 Claims, 4 Drawing Figures

PRIOR ART

READ ONLY MEMORY ORGANIZATION

BACKGROUND OF THE INVENTION

1. Field of the Invention

This invention relates to digital computers having memories, or at least portions of memories in which the information stored is fixed. More specifically, this invention is directed toward a high speed read only memory and an organization used in such a memory.

2. Description of the Prior Art

The read only memory has been known for years, however, the cost of solid state elements needed for utilization has hampered widespread commercial application. In the prior art, a plethora of solid state elements were used, one for each binary ONE date storing crossover of a word and digit line in a memory plane. One technique for reducing the number of diodes required is disclosed in U.S. Pat. Ser. No. 40,019 filed May 25, 1970 by W. F. Jordan, Jr. now U.S. Pat. No. 3,653,004 to a Read Only Memory Organization assigned to the same assignee as the present invention.

OBJECTS OF THE INVENTION

It is an object of the present invention to provide an improved organization for a read only memory.

It is another object of the invention to provide a read only memory organization utilizing a minimum number of solid state elements.

It is another object of the instant invention to provide a read only memory utilizing only solid interconnections.

It is a further object of the invention to provide an improved read only memory which features easy interchangeability when unique information patterns are required.

It is another object of the invention to provide an improved read only memory in the form of matrix printed circuit boards.

SUMMARY OF THE INVENTION

These and other objects of the present invention are realized by providing a read only memory having a plurality of digit lines and a plurality of word lines arranged transverse to the digit lines, a plurality of semiconductor coupling means connecting the digit and word lines, the coupling means representing either a binary ONE or a binary ZERO. The maximum number of coupling means is determined by the fewer number of binary states in each digit line. A further feature includes inverter means connected to some of the digit lines. Another feature provides for a plurality of subdigit lines and solid interconnections replacing the solid state elements. The invention is utilized in recognition systems having a plurality of address selectors and a plurality of memory planes for providing a multi-bit word output.

BRIEF DESCRIPTION OF THE DRAWINGS

A complete understanding of the present invention and of the above and other advantages may be gained from a consideration of the following detailed description taken in conjunction with the illustrative Figures in which.

DETAILED DESCRIPTION OF THE PREFFERED EMBODIMENTS

Figure 1:
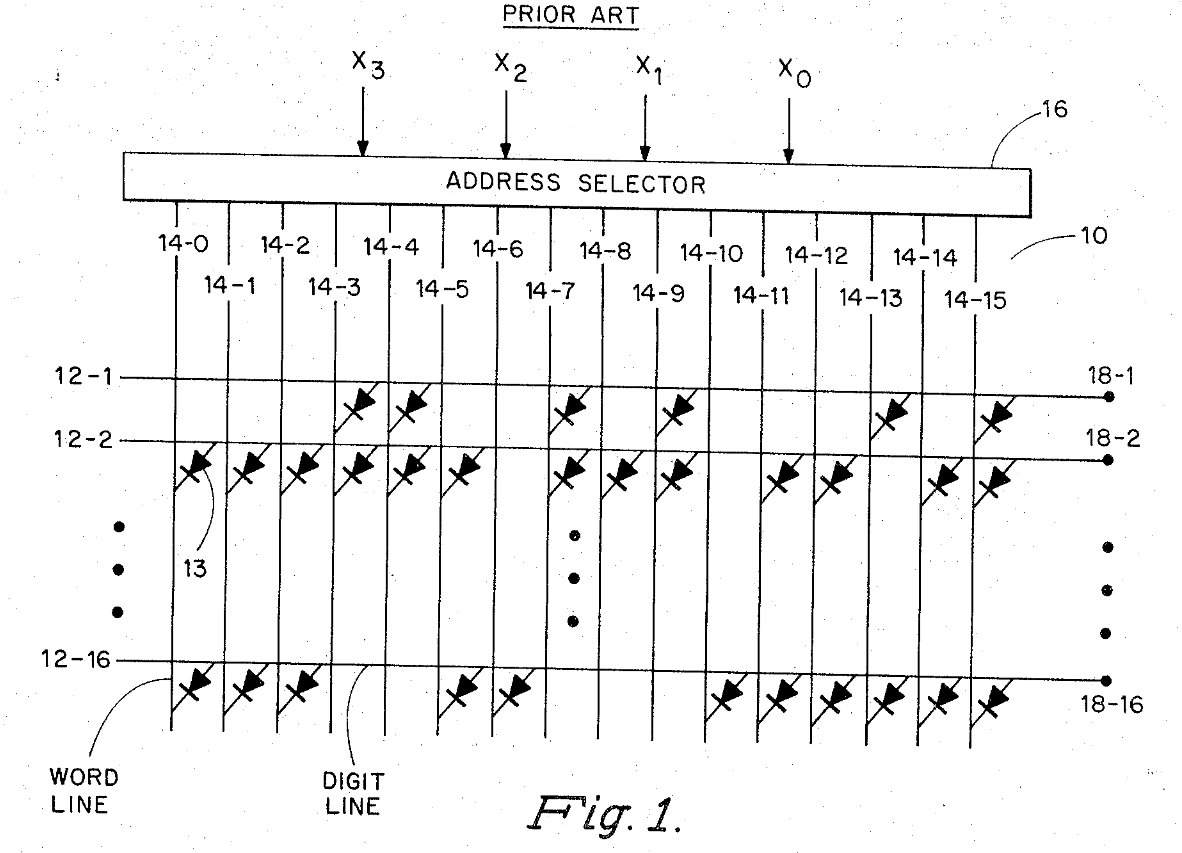
FIG. 1 is a schematic diagram of a prior art read only memory organization.

The read-only memory organization typical of the prior art is shown in FIG. 1 as represented by a 16-by-16 diode matrix 10 composed of digit lines 12-1, 12-2, . . . , 12-16 substantially orthogonal to word lines 14-0, 14-1, . . . , 14-15. Information in the ONE state is stored in this matrix by coupling the word and digit lines by solid state elements such as diodes 13 at crossover locations; information in the ZERO state has no solid state element connection at the intersecting location. Connected to the word lines 14-0 to 14-15 is an address selector 16 which receives a four bit signal $X_0$, $X_1$, $X_2$, $X_3$ by conventional means. As is well known in the art, a four bit signal may be decoded into 16 possible combinations. Each word line is coupled to receive one of the possible combinations. When the four bit signal is received at the address selector 16, a single word line of lines 14-0 to 14-15 will be energized and all the diode connections from that word line will transmit a ONE signal representing a binary ONE to one or more output terminals 18-1 to 18-16. The word lines which have no diode connection will transmit a ZERO signal representing a binary ZERO to the remaining output terminals 18-1 to 18-16. The operation of the prior art is as follows. A four bit input signal $X_0$, $X_1$, $X_2$, $X_3$ is received at address selector 16 which selects a word line of matrix 10 to be energized. For exemplary purposes let us assume that word line 14-0 is selected. Current then passes through word line 14-0. At the intersection of digit line 12-1 there is no diode connection and hence no current will flow in digit line 12-1. The output terminal 18-1 of digit line 12-1 is then considered to have a ZERO signal. At the intersection of digit line 12-1, there is a diode 13 connection. Current will flow from word line 14-0 through diode 13 to digit line 12-2, to output terminal 18-2. The output of digit line 12-2 is considered to be a ONE signal. Similarly, at the intersection of digit line 12-16 with word line 14-0 we have a diode and the output at output terminal 18-16 will be considered a ONE signal. Thus when word line 14-0 is energized the binary number 01 . . . 1 will always be generated from digit lines 12-1 to 12-16 respectively. If word line 14-3 is selected, the binary number at output terminals 18-1, to 18-16 will be 11 . . . 0. Similarly, if word line 14-15 of matrix 10 is energized the binary number 11 . . . 1 will always be transmitted to output terminals 18-1 to 18-16. It will be appreciated that in the traditional read-only memory organizations as shown in FIG. 1, the total number of diodes is at least equal in number to the number of ONE information signals stored. In this example, 30 diodes were used on digit lines 12-1, 12-2, and 12-16. By Applicant's invention of providing a diode for the lesser number of binary states represented in a digit line only fourteen diodes were used for the corresponding digit lines as will be shown by examination of FIG. 2.

Figure 2:
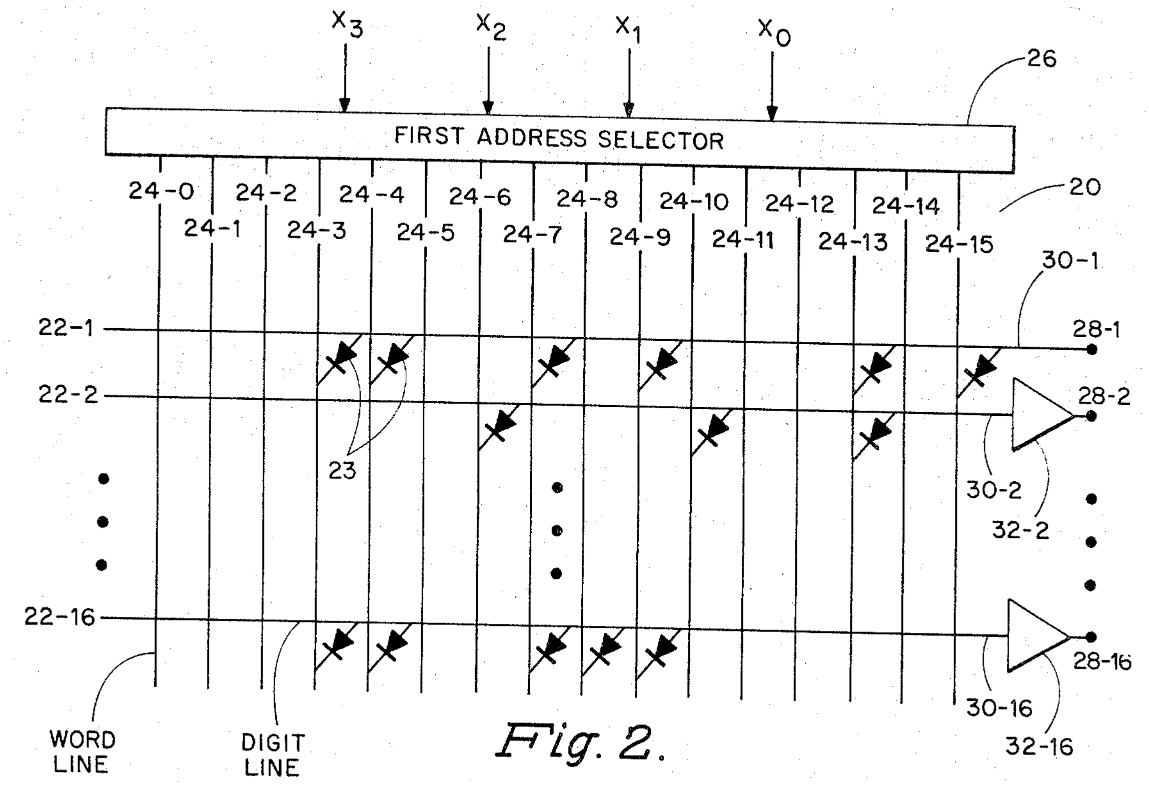
FIG. 2 is a schematic diagram of a first preferred embodiment of the invention showing a memory arranged in a matrix.

A matrix 20 is illustrated in FIG. 2 which produces, by design, the same results as FIG. 1. A 16-by-16 matrix was chosen for exemplary purposes only since all the possibilities that a four bit signal provides are presented in the 16 word lines. Obviously, as is well known in the art, the digit lines can be more or less than 16 but for purposes of symmetry only square matrices have been shown. Other matrices obvious to one of ordinary skill in the art may be used, for example, a 32-by-32 matrix utilizing a five bit signal, etc. Matrix 20 includes a plurality of word lines 24-0, 24-1, . . . , 24-15, transverse to a plurality of digit transmitting elements or digit lines 22-1, 22-2, . . . , 22-16. In FIG. 2, a four-bit signal $X_0$, $X_1$, $X_2$, $X_3$ is connected to first address selector 26 which in turn is connected to word line 24-0, 24-1, . . . , 24-15. The first address selector 26 will energize only one word line. As was the case for address selector 16 of FIG. 1, the selection of the word line depends on the information contained in the four bit signal.

Electrically connected to some of the word lines at the intersection or crossover point are solid state elements such as diodes 23. An intersection or crossover can be visualized by a view taken perpendicular to and at a point removed from the plane incorporating the digit lines and the parallel plan incorporating the word lines. From this view it would appear that word lines of one plane intersect or crossover the digit lines of the other plane. Although there are no common points, the overlap produced by the view is considered for exemplary purposes, an intersection or crossover. It is noted that the connections do not have to be at crossover; however, for exemplary purposes, this basis will be used. The other end of diodes 23 are connected to a digit line.

Diode 23 represents certain information in the form of a binary state stored in the memory unit 20. A feature of Applicant's invention is the provision of having the diodes represent the lesser number of binary states in a given digit line. Thus diode 23 may represent a binary ONE or a binary ZERO. The digit lines are electrically connected to output terminals 28-1, 28-2, . . . , 28-16 via output lines 30-1, 30-2, . . . , 30-16. The output lines are extensions of the respective digit lines. Between output terminals 28-1 to 28-16 and output lines 30-1 to 30-16, there may be a device for changing a first binary state to a second binary state, which device shall be hereinafter referred to as a complementer, as shown at 32-2 and 32-15. The complementer may be an inverter, flip-flop, NOR gate, NAND gate, etc. The complementer is used to maintain a consistent output representation. Output terminals 28-1 to 28-16 may be connected to lines 62-1, 62-2, . . . , 62-16, as will be discussed with reference to FIG. 4.

In the first digit line 12-1 of FIG. 1, there are six binary ONEs and 10 binary ZEROs stored. In FIG. 2 connected to digit lines 22-1, Applicant also provides six diodes 23 to represent the binary ONEs since they are the fewer number of binary states in the digit line. The second digit lines 12-2 of FIG. 1 has thirteen binary ONEs and three binary ZEROs stored. In its equivalent in FIG. 2, i.e., digit line 22-2, Applicant provides three diodes 23 to represent the binary ZEROs since they are the fewer number of binary states in the digit line. Similarly in digit line 22-16, the five diodes 23 represent binary ZEROs since digit line 12-16 has stored eleven binary ONEs and only five binary ZEROs. The general rule which governs diode representation is to ascertain a first total number of binary ONEs and a second total number of binary ZEROs stored in each digit line with the diode representing the binary state which corresponds to the fewer of these numbers. In the case of a 16 word line by sixteen digit line matrix, a maximum of eight diodes is needed per digit line with a worst case usage of 128 diodes needed to represent the 256 locations of information. As is readily apparent, the number of diodes actually used is smaller than the worst possible case. In the preferred example using three digit lines, Applicant used only 14 diodes whereas the prior art required 30.

In operation, a four bit signal $X_0$, $X_1$, $X_2$, $X_3$ is generated by conventional means and received by first address selector 26 which translates this information to electrically energize a single word line of lines 24-0 to 24-15. For purposes of illustration, assume word line 24-0 is energized. An electrical signal is transmitted through the entire length of word line 24-0. Since there are no diode interconnections, no digit line is electrically energized and hence the output binary signal at output lines 30-1 to 30-16 is 00 . . . 0 respectively. If word line 24-3 is energized, the output binary signal at lines 30-1 to 30-16 is 10 . . . 1 respectively. This result occurs since in digit line 22-1 there is a diode 23 electrically connected to word line 24-3 and electrically connected at its other end to digit line 22-1 resulting in an output signal at output line 30-1. There is no diode connection in digit line 22-2, and hence no electrical signal from the selector is transmitted. In digit line 22-16 a diode connection exists which produces an electrical signal at output line 30-16.

It is noted that in the prior description of FIG. 2, it was stated that the diodes connected to digit lines 22-2 and 22-16 represent binary ZERO states. By complementing the output of the digit lines a is shown by complementer 32-2 and 32-16 respectively, the signal received at output terminals 28-2 and 28-16 will have its binary state changed. In view of this inversion, a diode represents a ZERO signal. It should be noted that the complementer does not have to be placed between the output terminals 28-1 to 28-16 and lines 30-1 to 30-16, but may be placed anywhere the signal is strobed and before the gates 66-1, . . . , 66-4, . . . , 69-1, . . . , of FIG. 4, which will be explained later.

Viewing the output terminals of the matrix 20, the electrical signal which will be strobed when word line 24-0 is energized will be 01 . . . 1, as was the case for the prior art configuration of FIG. 1. When word line 24-3 is energized, the output terminals 28-1 to 28-16 will receive a 11 . . . 0 signal. Similarly, for word line 24-15, the output transmitted will be 11 . . . 1.

Figure 3:
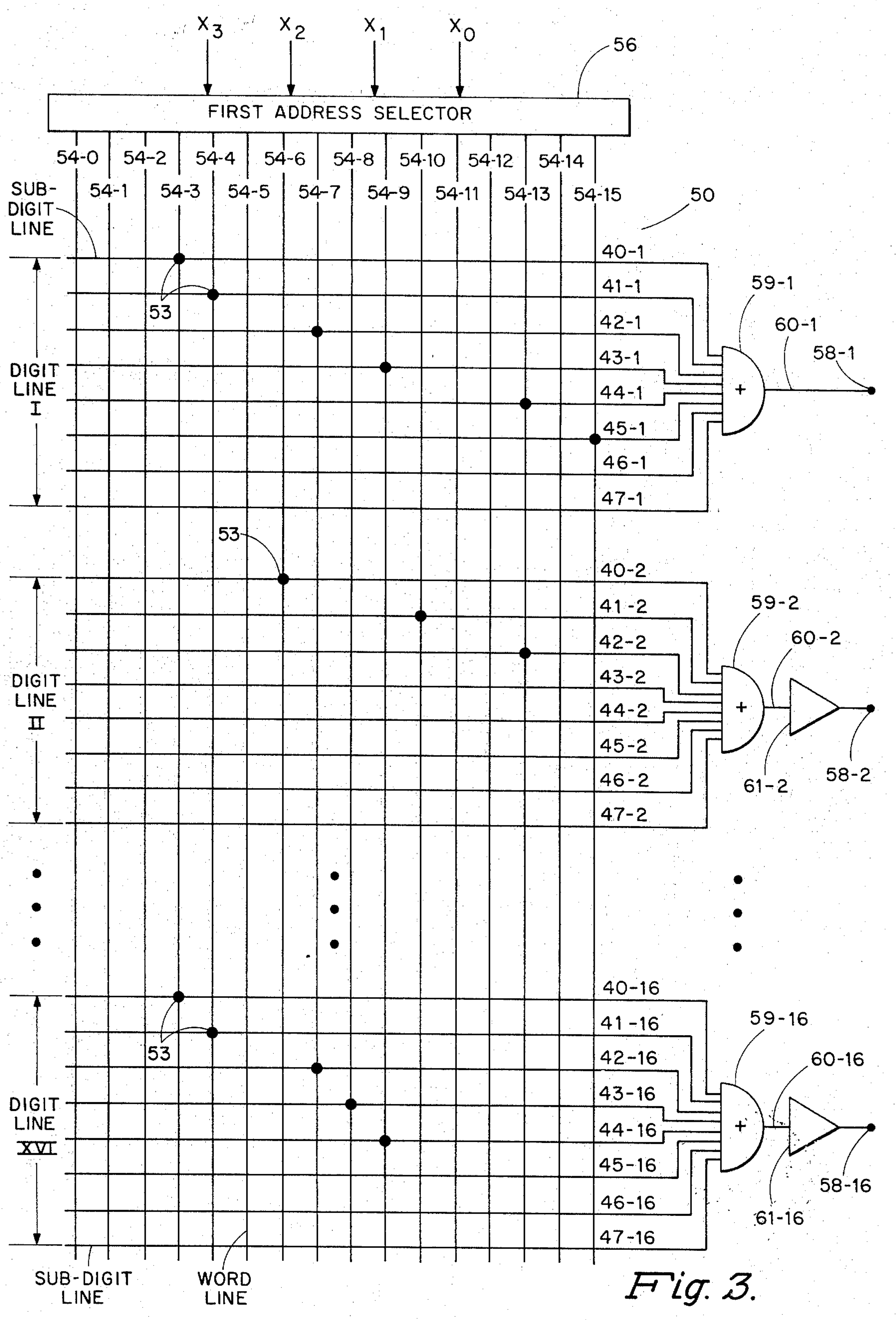
FIG. 3 is a schematic diagram illustrating a second preferred embodiment of the invention showing a memory arranged in a matrix.

FIG. 3 shows a further technique for reducing the number of solid state elements in the memory. In FIG. 3 all the solid state elements of matrix 50 are replaced by physical interconnections as shown at 53.

In FIG. 3, each of the digit transmitting elements or digit lines of FIG. 2 is replaced by a group of eight digit transmitting elements, hereinafter referred to as sub-digit lines. Thus, digit line I comprises eight sub-digit lines and is equivalent to digit line 22-1 of the embodiment of FIG. 2. Eight sub-digit lines are only necessary since the technique expounded provides that there need be no more than one-half the number of information locations per digit line. In the example shown there was 16 word lines, and thus a maximum total of eight sub-digit lines is provided. If there were 32 word lines, a maximum of 16 sub-digit lines would be needed to replace each digit line. This plurality of sub-digit lines is justified by the fact that high batch fabricated technology (i.e., printed circuits, welded flat cables, thin films, thick films, weaving, etc.) provides a significantly cheaper cost for line interconnections than for diodes per se and diode interconnection. A further feature of Applicant's invention, which will be subsequently explained, reduces the number of sub-digit lines thus providing potentially greater savings.

A memory unit 50 is illustrated in FIG. 3 which produces, by design, the same results as obtained in FIGS. 1 and 2. FIG. 3 includes a plurality of digit lines I to XVI, each digit line comprising eight sub-digit lines. Each group of sub-digit lines, e.g. digit line I, and intersecting word lines, e.g. 54-0 to 54-15, is considered a sub-matrix. A sub-matrix, therefore, is 16 word lines by eight sub-digit lines.

In FIGS. 3, a four bit signal $X_0$, $X_1$, $X_2X_3$ is connected to a first address selector 56, similar to selector 26 of FIG. 2, which in turn is connected to word lines 54-0 to 54-16. As was described earlier, the first address selector will energize only one word line. Electrically connected to some of the word lines at crossover with the sub-digit lines are physical or mechanical (i.e., without solid state elements such as diodes) interconnections 53 which represent certain information. Crossovers are defined and viewed exactly as described with respect to FIG. 2.

Only one interconnection per sub-digit line is used so that the necessary isolation in the matrix is attained. Interconnection 53 may represent a ONE bit or a ZERO bit as explained earlier. Although other arrangements may be used, the configuration for the interconnection of word lines is determined as follows. Corresponding to the first diode connection from word line 24-3 to digit line 22-1 of FIG. 2, and interconnection of the corresponding word line 54-3 with any sub-digit line of digit line I, preferably the first sub-digit line, is made; for the second diode connection of word line 24-4 and digit line 22-1, an interconnection of the corresponding word line in this case word line 54-4, with a different sub-digit line of digit line I is made. The preferable sub-digit line is the second one. If there is a maximum of eight diode connections, all the sub-digit lines will be used. As is more ofter the case, however, not all the sub-digit lines will have interconnections since the number of direct interconnections of FIG. 3 corresponds to the number of diodes of FIG. 2. Thus in digit line I it should be noted that sub-digit lines 46-1 and 47-1 have no connections whatsoever. Similarly, sub-digit lines 43-2 to 47-2 of digit line II and sub-digit lines 45-16 to 47-16 of digit line XVI have no interconnections. These sub-digit lines could be omitted, if desired.

The sub-digit lines are electrically connected to output terminals 58-1 to 58-16 via gates 59-1 to 59-16, shown here as OR gates, respectively. Between output terminals 58-1 to 58-16 and gates 59-1 to 59-16, there are output 60-1 to 60-16. The output lines may have a complementer as shown at 61-2 and 61-16, identical in operation to those explained earlier in FIG. 2.

In operation, a four bit signal $X_0$, $X_1$, $X_2$, $X_3$ is generated by conventional means into first address selector 56 which translates the signal to select a single word line 54-0 to 54-16. For illustrative purposes assume that word line 54-0 is energized. An electrical signal is transmitted the entire length of word line 54-0. Since there are no interconnections, sub-digit lines 40-1, 40-2, 40-16 will remain in their same state. Since no signal is received by gates 59-1 to 59-16, their output will remain unchanged. Output terminal 58-1 will thus indicate a ZERO signal when strobed. Output terminal 58-2 will indicate a ONE signal when strobed since no signal has been transmitted to gate 59-2. Complementer 61-2 on output line 60-2 has complemented the ZERO signal to indicate a ONE signal. Similarly, output terminal 58-16 will indicate a ONE signal when strobed since its ZERO signal has been complemented. Thus the output signal at the output terminals 58-1 to 58-16 will be 01 . . . 1, identical to that of FIGS. 1 and 2. If word line 54-3 is energized, the output binary signal at terminals 58-1 to 58-16 will be 11 . . . 0. This results since digit line I has an interconnection which will provide an output on sub-digit line 40-1 which is not complemented. Digit line II has no interconnection and thus no output is received on sub-digit lines 40-2 to 47-2, but the binary state after gate 59-2 is complemented by complementer 61-2 and hence provides a ONE signal at output terminal 58-2. Digit line XVI has an interconnection which will provide an output on sub-digit line 40-16 but this output will be complemented at complementer 61-16 and result in a ZERO signal at output terminal 58-16. Thus the output is identical to FIGS. 1 and 2 and the result is obtained in the same manner as indicated in FIG. 2.

Figure 4:
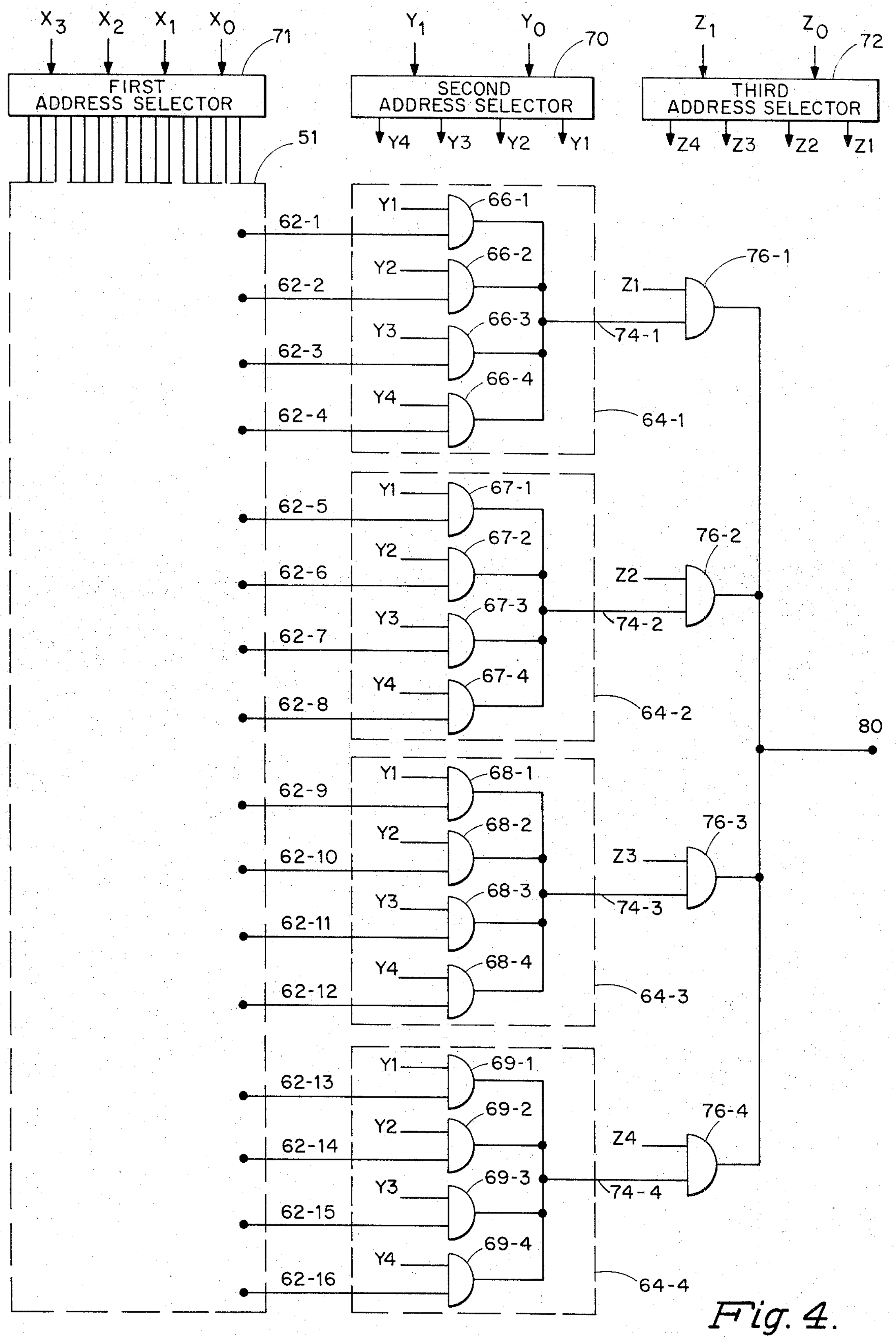
FIG. 4 is a schematic diagram illustrating the embodiments of either FIGS. 2 or 3 with additional selection logic.

FIG. 4 shows a selection matrix which may include the matrices of either FIGS. 2 or 3 enclosed in dotted lines 51. The lines 62-1 to 62-16 are connected to the respective output terminals of either FIG. 2 or FIG. 3. Thus line 62-1 would be connected to output terminal 28-1 of FIG. 2 or to output terminal 58-1 of FIG. 3. The other end of lines 62-1 to 62-16 is connected to gates 66-1, . . . , 66-4, . . . , 69-1, . . . , 69-4, respectively which are within dotted enclosures 64-1 to 64-4 respectively. If desired, the complementers shown as 32-2 and 32-16 in FIG. 2 and 61-2 and 61-16 in FIG. 3, could be connected anywhere along lines 62-2, 62-16. Alternatively, gates 66-1 to 69-4 could have two inputs each, one of which is a complement input (not shown) and the other of which is a direct no-complementing input as shown. In this alternate arrangement upon connection of the matrix to the respective gates, the selection of the complementing or non-complementing connections would be made after a determination of the diode representation for the digit line.

Gates 66-1 to 69-4 are shown here as AND gates and have a second input which is connected to second address selector 70. Selector 70 is coupled to receive a two bit input signal $Y_0$, $Y_1$. As is well known a two bit signal has four possible combinations. Second address selector 70 provides for selection of one of four possible combinations by providing an electrical output to anyone of lines Y1, Y2, Y3, Y4. One of these lines is connected to one gate within each of the dotted groups 64-1, . . . , 64-4, each group representing the outputs of four gates, e.g., 66-1 to 64-4, tied together in a "wired or" configuration. Thus line Y1 is connected to four gates shown here as AND gates; one gate being located in each group. Line Y1 is connected to gates 66-1, 67-1, 68-1, 69-1; line Y2 is connected to gates 66-2, . . . , 69-2, etc. Group 64-1 includes the outputs of gates 66-1 to 66-4; group 64-2 represents the output of gates 67-1 to 67-4, etc. As is known in the art, there will only be four outputs from gates 66-1 to 69-4, one from each group 64-1 to 64-4. Each output of each group is connected as one input via line 74-1, . . . , 74-4, respectively, to gates 76-1, . . . , 76-4, respectively. Gates 76-1 to 76-4 are illustratively shown as AND gates. A second input is provided into gates 76-1 to 76-4 from a third address selector 72 via output lines Z1, Z2, Z3, Z4. Third address selector 72 is essentially the same as the second address selector and is coupled to receive a two-bit input signal $Z_0$, $Z_1$ and has a four line output Z1, 2, Z2, Z4. Output line Z1 is electrically connected to gate 76-1; output line Z2 is electrically connected to gate 76-2, etc. There is only one output terminal 80 from gates 76-1 to 76-4 which gate outputs are also tied together in a "wired or" configuration. The signal received at output terminal 80 represents one binary state of the 256 binary states in the matrix within dotted lines 51.

In operation, the first address selector selects a single word line which provides a binary number output transmitted to lines 62-1 to 62-16. From a total selection of 256 binary states, there are 16 binary number outputs. In our embodiments if the diode or physical interconnection represents a binary ZERO, then the output is complemented before entering the gates 66-1 to 69-4. The second address selector 70 provides the second input to each gate 66-1 to 69-4. As is known in the art, there will only be four outputs from gates 66-1 to 69-4, one from each group 64-1 to 64-4. It is now apparent that from the total of 256 binary state selections, there are four binary number outputs. Each output from block 64-1 to 64-4 provides a respective input into gates 76-1 to 76-4, the second input of these gates being received from a third address selector 72. There will be only one binary number at output terminal 80 from the gates 76-1 to 76-4. Thus a single binary number has been selected from 256 binary number locations by use of the three address selectors.

If a multi-bit word output is required, several memory planes may be stacked together. Thus, for example, if an eight binary number word output is required, eight memory plane stacks could be wired in parallel and produce an eight binary number word output. That is, selectors 70, 71 and 72 would be common to and select eight similar memory planes as shown in FIG. 4.

In an alternative embodiment, a five bit signal to a first address selector, a three bit signal to a second address selector and a two bit signal to a third address selector was used. This provided a maximum of 16 diodes per digit line or a worst case usage of 512 diodes for a 1024 binary number memory, while still retaining a one bit selection. It is apparent that other modifications of the multi-signal addresses are possible.

A further feature of Applicant's invention is the limiting of the number of digit lines and interconnections actually used. As is illustratively shown in FIG. 3, each digit line in the prior art is replaced by a group of sub-digit lines. By having the diode represent the lesser number of binary states in a digit line, the maximum number of sub-digit lines in each group can never be greater than half the number of total binary states. Thus in FIG. 3 each sub-digit line group is shown as a 16 word line by eight sub-digit line matrix. It is noted, however, that many sub-digit lines are not needed. Thus in digit line I, digit lines ending in lines 36-1, 37-1 have no physical interconnection and may be eliminated, producing a 16 by six sub-matrix. In word line II, only three sub-digit lines are needed; output lines 33-2 to 37-2 may be eliminated thereby providing a 16 word line by three sub-digit line sub-matrix.

According to yet another feature of the invention, it may be appreciated that the individual sub-matrices as represented by digit lines I to XVI may be interchangeable and/or replaceable. If each sub-matrix is an individual board, it may be disconnected and replaced by another sub-matrix storing a different information pattern. If a plurality of sub-matrices are on an individual board, or if the entire total of sub-matrices are on one board, the same easy disconnection and replacement may be effected. Thus a control memory is provided which can be altered immediately and inexpensively.

Modifications of the preferred embodiment are apparent. Today it is highly unusual to use AND and OR gates which were illustratively shown. Any equivalent, i.e., NAND, NOR, exclusive OR, etc., may be used in their place in view of Applicant's teachings.

It should also be understood that is it not necessary to complement the diode output when the diode represents a binary ZERO. The diode representation can be based on a ZERO signal with all representations of binary ONE's complemented. If this is contrary to the information stored in other memory planes of a total memory system, the output terminal 80 can then be complemented. This is a preferred mode when it reduces the total number of complementer circuits at the output of each sub-digit line group.

Additional modifications are envisioned. Thus the address selector may comprise more or less than the three address selectors shown in the preferred embodiment. Any solid state device, such as transistors as shown in U.S. Pat. No. 3,461,431 issued Aug. 12, 1969, to P. B. Ellinger et al., may be used in place of the diode.

It should be understood that other changes and modifications in the form, arrangement and combination of the high-speed read only memory may be made and substituted for those herein shown and described without departing from the nature and principle of my invention.

Having thus described my invention, what I claim and desire to secure by Letters Patent is:

1. A read only memory comprising:

a plurality of digit lines, each said digit line including a group of sub-digit lines;

a plurality of word lines arranged transverse to said sub-digit lines;

a plurality of coupling means for electrically coupling said sub-digit lines and said word lines in accordance with information stored in said memory, said information including a first binary state and a second binary state;

said coupling means for each said digit line representing that binary state which is the lesser number of binary states of said each said digit line;

complementer means coupled to said digit lines having coupling means representing one of said binary states.

2. A memory as defined in claim 1 wherein:

each said sub-digit line includes no more than one coupling means connected thereto.

3. A memory as defined in claim 2 wherein:

the number of sub-digit lines in said each group of sub-digit lines is not greater than one-half the total number of said word lines.

4. A memory as defined in claim 3 wherein:

the number of sub-digit lines in said each group of sub-digit lines is equal to the number of said coupling means in said group of sub-digit lines.

5. A memory as defined in claim 4 wherein: said coupling means is a physical interconnection.

6. A read only memory comprising:

a plurality of word lines;

a plurality of digit lines arranged in a matrix with said word lines;

a plurality of coupling means for connecting some intersection of said matrix, said coupling means representing information in either a first or second binary state;

said coupling means representing said first binary state for each of said digit lines wherein the total number of said first binary states is less than the total number of said second binary states;

said coupling means along the remainder of said digit lines representing said second binary state;

complementer means coupled to said digit lines having said means representing a first binary state;

at least a first address selector, said first address selector electrically connected to said word lines to selectively energize one of said word lines;

a plurality of first gating means coupled to said plurality of digit lines, said plurality of first gating means includes a plurality of gating elements, each of said plurality of gating elements having a first and second input, a plurality of first output terminals electrically coupled to said digit lines.

7. A memory as defined in claim 6 further including:

a second address selector having a plurality of output lines;

said first input to said gating elements electrically connected to one of said output lines of said second address selector;

said second input to said gating elements electrically connected to one of said digit lines; and said gating elements having an output coupled to one of said first output terminals.

8. A memory as defined in claim 7 and further including:

a third address selector having a plurality of second output lines;

a plurality of second gating means, each having a third and a fourth input and an output;

said third input to said second gating means electrically connected to one of said second output lines from said third address selector;

said fourth input to said second gating means electrically connected to said one of said first output terminals;

said output of said plurality of second gating means connected to a second output terminal;

said second output terminal providing a selected binary state.

* * * * *